United States Patent

Ueda et al.

[11] Patent Number: 5,529,889
[45] Date of Patent: Jun. 25, 1996

[54] HEAT DEVELOPABLE PHOTOSENSITIVE MATERIAL AND IMAGE FORMING METHOD WHICH USES THE SAME

[75] Inventors: Hiromi Ueda, Tsukuba; Tetsuro Fukui, Kawasaki; Takehiko Ooi; Kenji Kagami, both of Atsugi; Masao Suzuki, Tokyo; Katsuya Nishino; Tetsuya Higuchi, both of Hiratsuka, all of Japan

[73] Assignee: Canon Kabushiki Kaisha, Tokyo, Japan

[21] Appl. No.: 354,445

[22] Filed: Dec. 12, 1994

Related U.S. Application Data

[63] Continuation of Ser. No. 24,280, Mar. 1, 1993, abandoned.

[30] Foreign Application Priority Data

| Mar. 2, 1992 | [JP] | Japan | 4-044569 |
| May 18, 1992 | [JP] | Japan | 4-124973 |

[51] Int. Cl.⁶ .............. G03C 5/26; G03C 1/10
[52] U.S. Cl. .............. 430/353; 430/530; 430/592; 430/619
[58] Field of Search .............. 430/203, 264, 430/530, 567, 619, 592, 353

[56] References Cited

U.S. PATENT DOCUMENTS

| 2,681,294 | 6/1954 | Beguin | 117/34 |
| 3,080,254 | 3/1963 | Grant | 117/36.8 |
| 3,635,719 | 1/1972 | Ohkubo et al. | 96/114.1 |
| 3,719,495 | 3/1973 | Lea | 96/114.1 |
| 4,123,274 | 10/1978 | Knight et al. | 96/66 T |
| 4,220,709 | 9/1980 | deMauriac | 430/353 |
| 4,740,455 | 4/1988 | Kubodera et al. | 430/617 |
| 4,746,603 | 5/1988 | Yamashita et al. | 430/605 |
| 5,059,508 | 11/1991 | Vaes et al. | 430/204 |
| 5,082,763 | 1/1992 | Kojima et al. | 430/353 |
| 5,171,657 | 12/1992 | Kagami et al. | 430/271 |
| 5,187,041 | 2/1993 | Mouri et al. | 430/201 |

FOREIGN PATENT DOCUMENTS

| 0353724 | 2/1990 | European Pat. Off. | G03C 1/498 |
| 0423399 | 4/1991 | European Pat. Off. | |
| 43-4924 | 2/1968 | Japan . | |
| 43-4921 | 2/1968 | Japan . | |
| 44-30270 | 12/1969 | Japan . | |
| 45-18416 | 6/1970 | Japan . | |
| 46-6074 | 12/1971 | Japan . | |
| 49-18808 | 5/1974 | Japan . | |
| 50-32927 | 3/1975 | Japan . | |
| 58-118639 | 7/1980 | Japan . | |
| 55-42375 | 10/1980 | Japan . | |
| 57-30828 | 2/1982 | Japan . | |
| 57-138630 | 8/1982 | Japan . | |
| 57-147627 | 9/1982 | Japan . | |
| 58-107534 | 6/1983 | Japan . | |
| 58-118638 | 7/1983 | Japan . | |
| 59-55429 | 3/1984 | Japan . | |
| 61-129642 | 6/1986 | Japan . | |
| 64-8809 | 2/1989 | Japan . | |
| 3-135564 | 6/1991 | Japan . | |
| 1467638 | 3/1977 | United Kingdom | G03C 1/12 |

OTHER PUBLICATIONS

Statutory Invention Registration No. H691, published Oct. 3, 1989.
Patent Abstracts of Japan, vol. 15, No. 406 (P-1263) Oct. 16, 1991 for JPA 3-163454.

*Primary Examiner*—Janet C. Baxter
*Attorney, Agent, or Firm*—Fitzpatrick, Cella, Harper & Scinto

[57] ABSTRACT

A heat-developable photosensitive material including a photosensitive layer formed on a support, the photosensitive layer at least containing an organic silver salt, a reducing agent, either a photosensitive silver halide or a photosensitive silver halide forming agent, and a sensitizing dye of the following general formula (I):

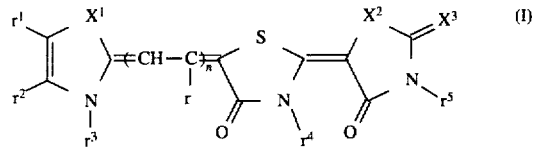

where r is hydrogen, halogen, substituted or unsubstituted alkyl, substituted or unsubstituted alkoxyl, substituted or unsubstituted aryl or substituted amino; $r^1$ and $r^2$ are each substituted or unsubstituted aryl or $r^1$ and $r^2$ are bonded to each other to form a condensed ring; $r^3$, $r^4$ and $r^5$ are each hydrogen, substituted or unsubstituted alkyl, alkenyl, substituted or unsubstituted aryl, or substituted or unsubstituted aralkyl; $X^1$ is oxygen, sulfur, carbon, nitrogen or selenium, wherein when $X^1$ is carbon or nitrogen, then $X^1$ is bonded to hydrogen, substituted or unsubstituted alkyl, substituted or unsubstituted aryl, or substituted or unsubstituted aralkyl; $X^2$ is oxygen or sulfur; $X^3$ is oxygen or sulfur; and n is 2. A polymerizable polymer precursor and a light polymerization initiator may also be employed in the material.

13 Claims, 5 Drawing Sheets

5,529,889

HEAT DEVELOPABLE PHOTOSENSITIVE MATERIAL AND IMAGE FORMING METHOD WHICH USES THE SAME

This application is a continuation of application Ser. No. 08/024,280 filed Mar. 1, 1993, now abandoned.

BACKGROUND OF THE INVENTION

1. Field of the Invention

The present invention relates to a heat-developable photosensitive material capable of forming an image by a dry process and to an image forming method which uses the heat-developable photosensitive material.

2. Description of the Prior Art

A silver salt photography method, which uses a silver halide, is a recording method which is used widely because of its excellent sensitivity and gradation expression capability. However, the fact that the process after exposing the image is performed in a wet manner causes problems to occur such that the material is unsatisfactory to work with, unsatisfactory to handle and unsatisfactory from a safety standpoint.

In the aforesaid circumstance, dry material not developed by a wet process has been researched and the results have been disclosed in Japanese Patent Publication No. 43-4921 and Japanese Patent Publication No. 43-4924. The aforesaid technology employs photosensitive silver halide in amounts sufficient to form a silver latent image and non-photosensitive organic silver salt as the image forming material. The organic silver salt serves as the image forming material because: (1) a latent image is formed by imagewise exposure on the photosensitive silver halide; and (2) the latent image serves as a catalyst when the photosensitive material is heated, which causes the organic silver salt and the reducing agent to take part in an oxidation-reduction reaction to reduce the organic silver salt to silver which forms the image.

Heat-developable photosensitive material has been used in a variety of industrial photosensitive materials in the image communication field, the medical field and computer output field because of its advantage that an image can be formed by using a dry process in place of the wet process.

Since the heat-developable material provides excellent photosensitivity and can easily be sensitized in the visible region because it contains silver halide as the photosensitive element, it has been used in a recording system which includes a light source comprising a gas laser, such as a He-Ne laser, an Ar ion laser and the like, which has an oscillation wavelength in the visible light region.

In recent years, a semiconductor laser has been developed. The cost, the size and the weight of the laser is much reduced. The semiconductor laser provides efficient output as compared with the gas laser and has been put into practical use in an optical disc such as a compact disc and a laser printer. Hence, it is expected that a dry image recording system, the cost and the size of which will be reduced and which provides excellent performance, will be realized by using a laser light source, and a heat-developable photosensitive material.

In order to improve photosensitivity with respect to long wavelength light and, in particular, to red light, a cyanine dye has been used in the conventional silver halide photosensitive material for the gelatin-type dry process. However, the cyanine dye has been considered to be unsuitable because it has a poor sensitizing efficiency with respect to the heat-developable photosensitive material for the dry process.

A merocyanine dye for use as the sensitizing dye to be contained in the heat-developable photosensitive material and disclosed in Japanese Patent Publication No. 49-18808 has encountered an unsolved problem of unsatisfactory stability of the sensitizing dye and in the sensitizing efficiency.

SUMMARY OF THE INVENTION

An object of the present invention is to provide a heat-developable photosensitive material and an image forming method which uses the heat-developable photosensitive material which is exposed by a semiconductor laser, an LED or the like and which has an oscillation wavelength in a red region or near the infrared region in order to constitute a compact and an economical imaging system.

A heat-developable photosensitive material according to the present invention comprises a photosensitive layer formed on a support, the photosensitive layer at least containing an organic silver salt, a reducing agent, either a photosensitive silver halide or a photosensitive silver halide forming agent, and a sensitizing dye expressed by the following general formula (I):

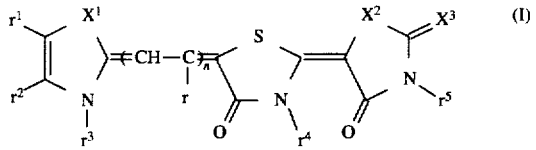

where r is a hydrogen atom, a halogen atom, a substituted or unsubstituted alkyl group, a substituted or unsubstituted alkoxyl group, a substituted or unsubstituted aryl group or a substituted or unsubstituted amino group, $r^1$ and $r^2$ are each substituted or unsubstituted aryl groups or $r^1$ and $r^2$ are bonded to each other to form a condensed ring, $r^3$, $r^4$ and $r^5$ are each hydrogen atoms, substituted or unsubstituted alkyl groups, alkenyl groups, substituted or unsubstituted aryl groups, or substituted or unsubstituted aralkyl groups, $X^1$ is an oxygen atom, a sulfur atom, a carbon atom, a nitrogen atom or a selenium atom, wherein when $X^1$ is a carbon atom or a nitrogen atom then $X^1$ is bonded to a hydrogen atom, a substituted or unsubstituted alkyl group, a substituted or unsubstituted aryl group or a substituted or unsubstituted aralkyl group, $X^2$ is an oxygen atom, a sulfur atom or a nitrogen atom and wherein when $X^2$ is nitrogen atom, then $X^2$ is bonded to a hydrogen atom, a substituted or unsubstituted alkyl group, a substituted or unsubstituted aryl group or a substituted or unsubstituted aralkyl group, $X^3$ is an oxygen atom or a sulfur atom, and n is 1 or 2.

An image forming method according to the present invention comprises the step of: subjecting the photosensitive material according to the present invention to image exposure and heating steps, so that an image is formed.

Other objects, features and advantages of the invention will be evident from the following description.

DESCRIPTION OF THE PREFERRED EMBODIMENTS

Figure 1:
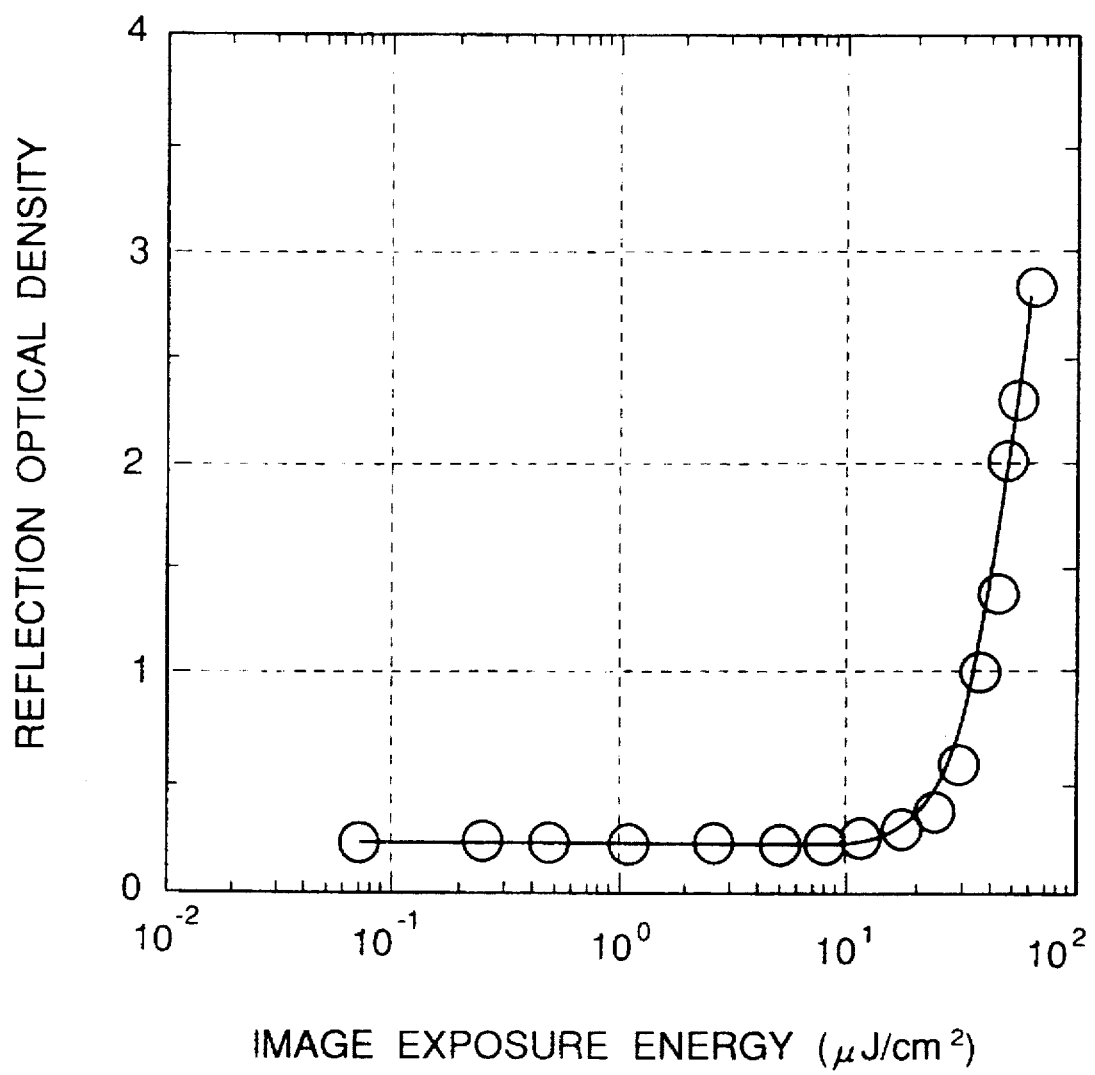
FIG. 1 is a graph which illustrates the reflecting optical density with respect to image exposing energy of a photosensitive material according to Example 1.

A heat developing photosensitive material according to the present invention has a photosensitive layer formed on a supporting member thereof. The photosensitive layer at least contains an organic silver salt, a reducing agent, a photosensitive silver halide and a sensitizing dye expressed by the following general formula (I):

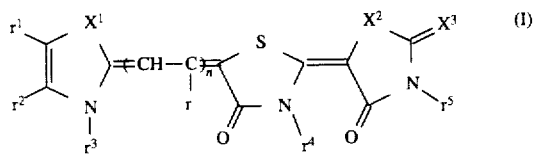

where r is a hydrogen atom, a halogen atom, a substituted or unsubstituted alkyl group, a substituted or unsubstituted alkoxyl group, a substituted or unsubstituted aryl group or a substituted or unsubstituted amino group, $r^1$ and $r^2$ respectively are substituted or unsubstituted aryl groups or $r^1$ and $r^2$ are bonded to each other to form a condensed ring, $r^3$, $r^4$ and $r^5$ respectively are hydrogen atoms, substituted or unsubstituted alkyl groups, alkenyl groups, substituted or unsubstituted aryl groups, or substituted or unsubstituted aralkyl groups, $X^1$ is an oxygen atom, a sulfur atom, a carbon atom, a nitrogen atom or a selenium atom and is bonded to a hydrogen atom, a substituted or unsubstituted alkyl group, a substituted or unsubstituted aryl group or a substituted or unsubstituted aralkyl group when $X^1$ is the carbon atom or the nitrogen atom, $X^2$ is an oxygen atom, a sulfur atom or a nitrogen atom which is bonded to a hydrogen atom, a substituted or unsubstituted alkyl group, a substituted or unsubstituted aryl group or a substituted or unsubstituted aralkyl group, when $X^2$ is the nitrogen atom, $X^3$ is an oxygen atom or a sulfur atom, and n is 1 or 2.

The halogen atom represented by r of general formula (I) is exemplified by fluorine, chlorine, bromine, and iodine.

The unsubstituted alkyl group represented by r, $r^3$, $r^4$, $r^5$, $X^1$ and $X^2$ each of which represents the substituted or unsubstituted alkyl group is a straight-chain or branched alkyl, preferably having 1 to 18 carbon atoms and is exemplified by methyl, ethyl, propyl, butyl, i-butyl, t-butyl, amyl, i-amyl, sec-amyl, hexyl, heptyl, octyl, nonyl, dodecyl, stearyl and behenyl.

The substituted alkyl group is an alkoxyalkyl group having 1 to 18 carbon atoms, an alkyl group halide having 1 to 18 carbons, a hydroxyalkyl group having 1 to 18 carbons, an amino alkyl group having 1 to 18 carbons or a carboxyalkyl group having 2 to 10 carbons. The alkoxy alkyl group is exemplified by methoxyethyl, ethoxymethyl, ethoxypropyl, ethoxybutyl, propoxymethyl, i-propoxypentyl and t-butoxyethyl.

The alkyl group halide is exemplified by chloromethyl, chloroethyl, bromoethyl, chloropropyl and bromohexyl.

The hydroxyalkyl group is exemplified by hydroxymethyl, hydroxyethyl, hydroxypropyl, hydroxypentyl, hydroxyhexyl, and hydroxyheptyl.

The amino alkyl group is exemplified by aminomethyl, acetylaminoethyl, dimethylaminoethyl, diethylaminoethyl, morpholinoethyl, piperidinoethyl, diethylaminopropyl, dipropylaminoethyl, acetylaminopropyl, aminobutyl, and morpholinobutyl.

The carboxyalkyl group is exemplified by carboxymethyl, carboxyethyl, carboxypropyl, and carboxyhexyl.

The substituted or unsubstituted alkoxyl group is exemplified by methoxy, ethoxy, propoxy, butoxy, methoxyethoxy, hydroxyethoxy and hydroxybutoxy.

The substituted by unsubstituted aryl group represented by r, $r^1$, $r^2$, $r^3$, $r^4$, $r^5$, $X^1$ and $X^2$ is exemplified by phenyl, tolyl, naphthyl, hydroxyphenyl and chlorophenyl.

The substituted or unsubstituted amino group represented by r is exemplified by amino, acetylamino, methylamino, dimethylamino, diethylamino, pyrrolidino, morpholino, benzenesulfonamino, toluenesulfonamino, dipropylamino, and dibutylamino.

The alkenyl group represented by $r^3$, $r^4$, and $r^5$ is exemplified by vinyl, propenyl, butenyl, pentenyl, hexenyl, heptenyl, octenyl, dodecenyl, and prenyl.

The substituted or unsubstituted aralkyl group represented by $r^3$, $r^4$, $r^5$, $X^1$ and $X^2$ is exemplified by benzyl, phenethyl, tolylmethyl, hydroxybenzyl, 2-hydroxy-3-methylbenzyl, and 2-hydroxy-3-t-butylbenzyl. It is permissible that $r^1$ and $r^2$ are bonded to each other to form a condensed ring which may be substituted by an alkyl group, a halogen atom or an alkoxyl group.

The sensitizing dye expressed by general formula (I) will now be described, but the compound expressed by general formula (I) is not limited to the descriptions below.

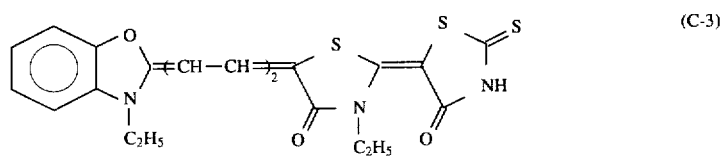

(C-3)

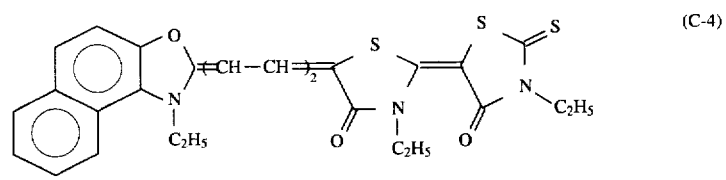

(C-4)

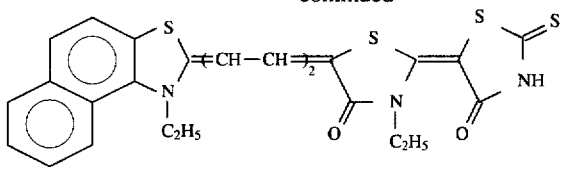
(C-5)

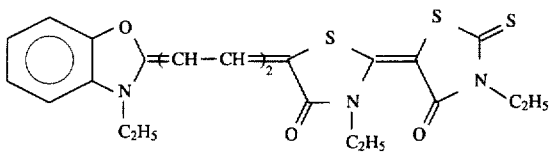
(C-6)

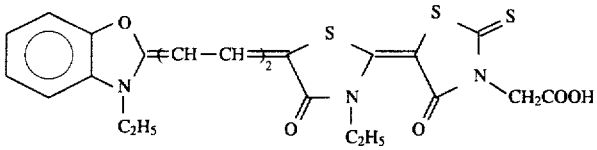
(C-7)

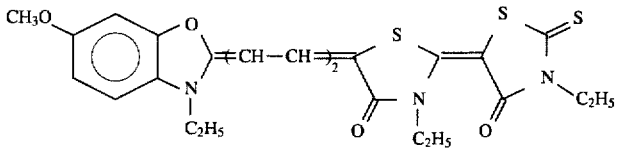
(C-8)

In the present invention, two or more different kinds of sensitizing dyes expressed by general formula (I) may be used together.

The organic silver salt according to the present invention may be an organic silver salt disclosed in the chapter "Non-Salt Substance" of "Basis of Photographic Industry" (the first edition issued in 1982) or Japanese Patent Laid-Open No. 59-55429 or a triazole type silver salt. It is preferable to employ a silver salt of a type having a low sensitivity and is exemplified by a silver salt of: an alphatic carboxylic acid; an aromatic carboxylic acid; a thiocarbonyl compound having a mercapto group or α-hydrogen and a compound containing an imino group.

The aliphatic carboxylic acid is exemplified by acetic acid, butyric acid, succinic acid, sebacic acid, adipic acid, oleic acid, linoleic acid, tartaric acid, palmitic acid, stearic acid, behenic acid, and camphoric acid. Since the silver salt having a smaller number of carbons is usually unstable, it is preferable to employ a compound having an appropriate number of carbons, for example, a compound having 16 to 26 carbons.

The aromatic carboxylic acid is exemplified by benzoic acid derivatives, quinolinic acid derivatives, naphthalene carboxylic acid derivatives, salicylic acid derivatives, gallic acid, tannic acid, phthalic acid, phenylacetic acid derivatives, and pyromellitic acid.

The thiocarbonyl compound having a mercapto group or α-hydrogen is exemplified by mercapto compounds illustrated in U.S. Pat. No. 4,123,274, such as 3-mercapto-4-phenyl-1,2,4-triazole, 2-mercaptobenzoimidazole, 2-mercapto-5-aminothiadiazole, 2-mercaptobenzothiazole, S-alkylthioglycolic acid (the alkyl group of which has 12 to 23 carbons), dithiocarboxylic acids, such as a dithioacetic acid, thioamides such as thiostearoamide, 5-carboxy-1-methyl-2-phenyl-4-thiopyridine, mercaptotriadine, 2-mercaptobenzooxazole, mercaptooxathiazole, and 3-amino-5-benzilthio-1,2,4-triazole.

The compound containing an imino group is exemplified by benzotriazole or its derivative disclosed in Japanese Patent Publication No. 44-30270 or 45-18416 and exemplified by (i) benzotriazole or its derivatives, for example, alkyl-substituted benzotriazole; such as benzotriazole and methylbenzotriazole; halogen-substituted benzotriazole, such as 5-chlorobenzotriazole; carboimidobenzotriazle, such as butylcarboimidobenzotriazole; nitrobenzotriazole disclosed in Japanese Patent Laid-Open No. 58-118639; sulfobenzotriazole disclosed in Japanese Patent Laid-Open No. 58-115638; carboxybenzotriazole or its salt; hydroxybenzotriazole; (ii) 1,2,4-triazole disclosed in U.S. Pat. No. 4,220,709; (iii) 1H-tetrazole; (iv) carbazole; (v) saccharin; (vi) imidazole and their derivatives.

The reducing agent according to the present invention reduces organic silver salt when the photosensitive material is heated in the presence of silver generated by the reduction of the photosensitive silver halide upon its exposed to light, so that a silver image is generated. The reducing agent is exemplified by phenol, bisphenol, trisphenol, tetrakisphenol, naphthol, bisnaphthol, dihydroxynaphthalene, sulfonamidophenol, trihydroxynaphthalene, dihydroxybenzene, trihydroxybenzene, tetrahydroxybenzene, hydroxyalkylmonoether, ascorbic acid, 3-pyrazolidone, pyrazolone, pyrazoline, saccharides, phenylenediamine, hydroxyamine, reductone, hydroxamic acid, hydrazine, hydrazide, amideoxime, and N-hydroxyurea. Among others, it is preferable to use anyone of p-bisphenol, o-bisphenol, bisnaphthol, p-substituted naphthol, and 4-substituted naphthol. Also a reducing agent disclosed in Japanese Patent Laid-Open No. 3-135564 may be employed preferably.

The photosensitive silver halide for use in the present invention is exemplified by silver chloride, silver bromide, silver chlorobromide, silver iodobromide, and chloroiodobromide.

The shape of the aforesaid silver halide may be cubic, octahedron or plate-like. It is preferable to employ the cubic or plate-like silver halide. It is preferable that the length of one side of the cubic silver halide be 0.01 to 2 μm, more preferably 0.02 to 1 μm.

It is preferable that the aspect ratio of the plate-like silver halide be 100:1 to 3:1, more preferably 50:1 to 5:1. It is preferable that the particle size of the plate-like silver halide be 0.01 to 2 μm, more preferably 0.02 to 1 μm.

The aforesaid silver halide may be subjected to chemical sensitization to which a photographic emulsion is ordinarily subjected. That is, sulfur sensitization, noble metal sensitization or reducing sensitization may be employed.

The silver halide may have a uniform crystalline structure or a multi-layer crystalline structure having locally different composition; e.g; a core of AgBr covered with shell of AgI. Furthermore, two or more types of silver halides having different halogen compositions, particle sizes or particle size distributions may be employed together.

The silver halide may contain iridium ions in the surface layer of the crystal thereof. The term "surface layer of the crystal" means a layer of a predetermined depth from the surface of the crystal of the silver halide. In the aforesaid case, it is preferable that the crystal of silver halide be formed into a tetragonal shape having (1,0,0) plane. It is preferable that one side of the silver halide be 0.001 μm to 1.0 μm, more preferably 0.01 μm to 0.2 μm, and most preferably 0.03 μm to 0.1 μm. It is preferable that the thickness of the surface layer of the crystal containing the iridium ions be 10% or less of the thickness of one side of the crystal, preferably 5% or less of the same. It is preferable that the surface layer of the crystal containing the iridium ions be 0.5% or more of the thickness of one side of the crystal.

The silver halide containing the iridium ions may be prepared by injecting a material supplying iridium ions at the time of generating the silver halide from organic silver salt to be reduced and a component for forming the silver halide. A preferable iridium supplying material is exemplified by iridium tetrachloride, iridium hexachloride (IV) potassium, and iridium hexachloride (IV) sodium.

The iridium ions can be contained in the surface layer of the silver halide crystal by injecting iridium supplying material after a certain time has passed from the commencement of generation of the silver halide. For example, the iridium ion supply material may be injected at a moment when 90 wt % of the predetermined amount of the silver halide has been prepared.

Although all the silver halide according to the present invention may contain the iridium ions, a mixture of silver halide containing the iridium ions and that which does not contain the same may be used.

It is preferable that the iridium ions be present in amounts of $1 \times 10^{-5}$ moles to $1 \times 10^{-2}$ moles and more preferably $5 \times 10^{-5}$ to $5 \times 10^{-3}$ moles per mole of the total amount of silver halide contained by the photosensitive layer.

The heat-developable photosensitive material according to the present invention may contain a thiol compound expressed by the following general formula (II) or (III). The heat-developable photosensitive material according to the present invention may contain both of the thiol compounds expressed by the following general formula (II) and (III). By containing the thiol compound expressed by the general formula (II) or (III), the sensitivity at the time of imagewise exposure is improved and the storage-stability characteristics over a period of time are improved. Furthermore, the temperature control required at the time of heat-development can be relaxed (that is, the heat developing latitude can be widened).

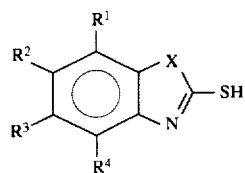

(II)

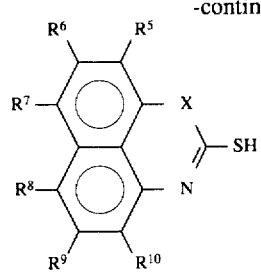

(III)

where $R^1$ to $R^{10}$ are each hydrogen, substituted or unsubstituted alkyl, substituted or unsubstituted alkoxy, carboxyl, substituted or unsubstituted aryl, sulfonic acid, substituted or unsubstituted amino, nitro, halogen, amide, alkenyl or alkenyl or allkynyl in which $R^1$ and $R^2$, $R^2$ and $R^3$, and $R^3$ and $R^4$ together form condensed rings, X is —O—, —N($R^{11}$)— or —S—, and $R^{11}$ is hydrogen, alkyl or aryl.

The alkynyl group represented by $R^1$ to $R^{10}$ is exemplified by ethynyl, butynyl, hexynyl and heptynyl.

The symbol X represents —O—, —N($R^{11}$)— or —S—. It is preferable that X is —O—.

Preferred structures of the thiol compounds expressed by general formulas (II) or (III) will now be described. The present invention is not limited to the following compounds expressed by general formulas (II) or (III).

(d-1)

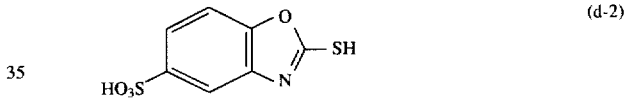

(d-2)

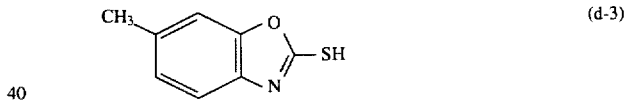

(d-3)

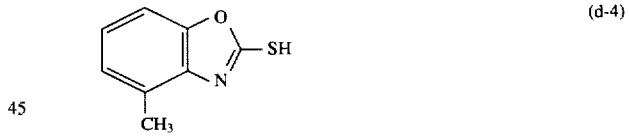

(d-4)

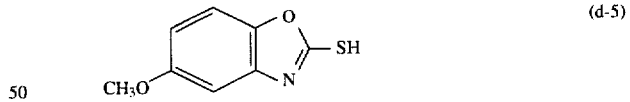

(d-5)

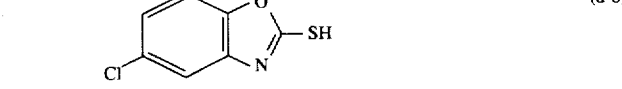

(d-6)

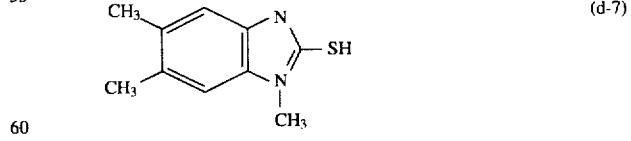

(d-7)

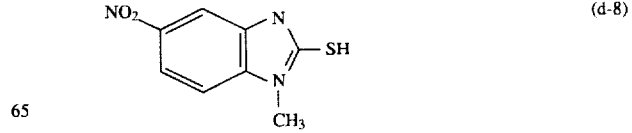

(d-8)

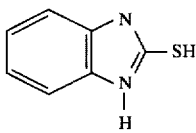
(d-9)

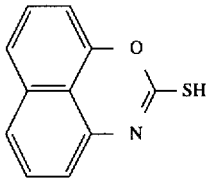
(d-10)

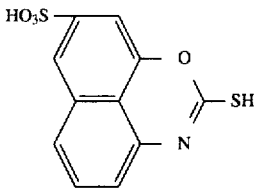
(d-11)

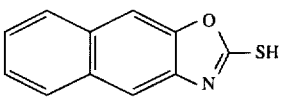
(d-12)

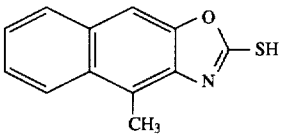
(d-13)

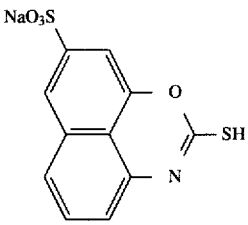
(d-14)

It is preferable that the photosensitive layer contains a binder in order to improve the film forming property and dispersibility. The binder is exemplified by esters of cellulose such as cellulose nitrate, cellulose phosphate, cellulose sulfate, cellulose acetate, cellulose propionate, cellulose butyrate, cellulose myristate, cellulose palmitate, cellulose acetate propionate, and cellulose acetate butyrate; ethers of cellulose such as methyl cellulose, ethyl cellulose, propyl cellulose, and butyl cellulose; vinyl polymers such as polystyrene, polyvinyl chloride, polyvinyl acetate, polyvinyl butyral, polyvinyl acetal, polyvinyl alcohol, and polyvinyl pyrrolidone; copolymers such as styrene-butadiene copolymer, styrene-acrylonitrile copolymer, styrene-butadiene-acrylonitrile copolymer, and vinyl chloride-vinyl acetate copolymer; acryl polymers such as polymethyl methacrylate, polymethyl acrylate, polybutyl acrylate, polyacrylic acid, polymethacrylic acid, polyacrylamide, and polyacrylonitrile; polyesters such as polyethylene terephthalate; polyacrylate polymers such as poly (4,4-isopropylidene-diphenylene-co-1,4 -cyclohexylene dimethylene carbonate), poly (ethylenedioxy-3,3'-phenylenethiocarbonate), poly (4,4'-isopropylidene diphenylene carbonate-co-terephthalate), poly(4,4'-isopropylidene diphenylene carbonate), poly (4,4'-sec-butylidene phenylene carbonate), and poly (4,4'-isopropylidene phenylene carbonate-block-oxyethylene); polyamides; polyimides; epoxy polymers; phenol polymers; polyolefins such as polyethylene, polypropylene, and chlorinated polyethylene; and natural polymers such as gelatin.

It is preferable that the photosensitive material according to the present invention contains an organic acid as is necessary in order to improve the color tone expressing characteristics and stability of the formed image. In particular, it is preferable that a long-chain fatty acid is present alone or in combination.

The photosensitive material according to the present invention may contain a color tone controlling agent which is exemplified by phthaladinone or its derivative disclosed in, for example, U.S. Pat. No. 3,080,254, a cyclic imide disclosed in Japanese Patent Laid-Open No. 46-6074, and a phthaladinone compound disclosed in Japanese Patent Laid-Open No. 50-32927.

The preferable composition ratio of the components of the photosensitive material according to the present invention is as follows:

It is preferable that the quantity of the organic silver salt for use in the present invention be 0.3 g/m² to 30 g/m², preferably 0.7 g/m² to 15 g/m², and further preferably 1.2 g/m² to 8 g/m² for each photosensitive layer.

The reducing agent is preferably employed in amounts from 0.05 to 3 moles per mole of the organic silver salt and more preferably 0.2 to 2 moles of reducing agent per mole of organic silver salt.

It is preferred that the photosensitive silver halide be present in amounts from 0.001 mole to 2 moles per mole of the organic silver salt and more preferably 0.05 mole to 1 mole per mole. In the present invention, a silver halide forming agent (for example, a halogen compound such as tetrabutylammonium bromide, N-bromosuccinimide, bromine or iodine) may be used in place of the silver halide. In this event, the overall content of the silver halide employed can be considered similarly to the case of the silver halide.

It is preferable to employ the sensitizing dye expressed by general formula (I) in amounts from $1 \times 10^{-5}$ to $10^{-2}$ mole per mole of the organic silver salt and, more preferably from $1 \times 10^{-4}$ to $1 \times 10^{-3}$ moles per mole of organic silver salt.

It is preferable that the thiol compound expressed by general formula (II) or (III) be contained in amount from $1.0 \times 10^{-1}$ to $2.0 \times 10^{2}$ moles, more preferably $5.0 \times 10^{-1}$ to $1.0 \times 10^{2}$ moles, and most preferably from 1.0 to $8.0 \times 10$ moles per mole of the sensitizing dye expressed by general formula (I).

It is preferable that the binder be employed as necessary usually in amounts from 0.5 to 10 parts by weight per part by weight of the organic silver salt, and more preferably 0.5 to 5 parts by weight.

It is preferable that the organic acid be provided as needed in amounts of 25 mole % to 200 mole % with respect to the organic silver salt, preferably 30 mole % to 120 mole %.

It is preferable that a color tone controlling agent be employed as needed in amounts from 0.01 to 5 moles per mole of the organic silver salt, more preferably from 0.05 to 2 moles, and, most preferably from 0.08 to 1 mole.

The photosensitive material according to the present invention may be a proper anti-fog agent as the need arises. The anti-fog agent is exemplified by a 1,2,4-triazole compound disclosed in Japanese Patent Publication No. 55-42375, a tetrazole compound disclosed in Japanese Patent Laid-Open No. 57-30828, benzoic acids disclosed in Japanese Patent Laid-Open No. 57-138630, a compound having a sulfonylthio group disclosed in Japanese Patent Laid-Open No. 57-147627, and dibasic acids disclosed in Japanese Patent Laid-Open No. 58-107534. In particular, it is preferable to employ the dibasic acids disclosed in Japanese Patent Laid-Open No. 58-107534. The dibasic acid is expressed by the following general formula:

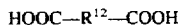

where $R^{12}$ is a straight or branched alkylene group or an alkenylene group having 4 or more carbons.

The photosensitive material according to the present invention may contain a color-protection agent as needed in order to prevent color formation in the portion in which no image is formed due to, for example, light after the image has been formed. It is preferable that the color-protection agent be a compound disclosed in, for example, Japanese Patent Laid-Open No. 61-129642. The aforesaid compound is expressed by the following general formula:

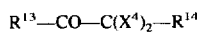

where $R^{13}$ is a substituted or unsubstituted alkyl group, a substituted or unsubstituted aryl group, an alkoxy group or an aryloxy group, $R^{14}$ is a hydrogen atom, substituted or unsubstituted alkyl group or substituted or unsubstituted aryl group, and $X^4$ is a chlorine atom, a bromine atom or an iodine atom.

The photosensitive material according to the present invention may further contain a development accelerating agent. A preferred development accelerating agent is exemplified by an alkali metal salt compound of a fatty acid disclosed in, for example, Japanese Patent Publication No. 64-8809.

The photosensitive material according to the present invention may contain a surface active agent of a type containing fluorine as required. Furthermore, it may contain both a surface active agent of the type containing fluorine and a nonionic surface active agent.

The photosensitive material according to the present invention may contain a ultraviolet absorbing agent, a halation protection dye (layer), an irradiation protection dye, a mat molding agent, and a fluorescent whitening agent, as needed.

The heat-developable photosensitive material according to the present invention can be obtained by forming the photosensitive layer containing the aforesaid components in the form of a single layer or a multi-layer structure. If the photosensitive layer is formed into the multi-layer structure, it is preferable that layers be composed of a layer containing the sensitizing dye expressed by general formula (I) and the layer containing the reducing agent. As an alternative to this, the multi-layer structure may be composed of a layer containing the organic silver salt, the silver halide and the reducing agent and the layer containing the sensitizing dye expressed by general formula (I) . The thiol compound expressed by general formula (II) or (III) is contained by the layer containing the sensitizing dye the as the need arises.

As the supporting member or support, a synthetic resin film made of polyethylene, polypropylene, polyethylene terephthalate, polycarbonate, cellulose acetate, synthetic paper, paper coated with a synthetic resin film made of polyethylene or the like, art paper, baryta paper for photography, a metal plate (foil) made of aluminum, a synthetic resin film having a metal evaporation film or a glass plate can be employed In order to improve the transparency of the heat-developable photosensitive material, thicken the image density, improve the long-term storage stability characteristics, and, if necessary, improve the heat resistance of the photosensitive material, a protection layer may be formed on the photosensitive layer. It is preferable that the thickness of the protection layer be 1 μ to 20 μ. If the protection layer is too thin, the aforesaid advantages are lost. If the same is too thick, a particular advantage may not be obtained, and the cost is raised. It is preferable that a polymer for use to forming the protection layer be a heat-resisting and a colorless polymer which can be dissolved by a solvent. The polymer is exemplified by polyvinyl chloride, polyvinyl acetate, a copolymer of vinyl chloride and vinyl acetate (preferably the vinyl chloride is 50 mole % or more), polyvinyl butyral, polystyrene, polymethylmethacrylate, benzyl cellulose, ethyl cellulose, cellulose acetatebutyrate, cellulose diacetate, cellulose triacetate, polyvinylidene chloride, chlorinated polypropylene, polyvinyl pyrrolidone, cellulose propionate, polyvinyl formal, cellulose acetate butyrate, polycarbonate, cellulose acetate propionate, gelatin, gelatin derivatives such as gelatin phthalate, acryl amide polymer, polyisobutylene, butadiene-styrene copolymer (at an arbitrarily monomer ratio), and polyvinyl alcohol. In addition to the aforesaid binder, colloidal silica may be contained by the protection layer.

It is preferable for the protection layer to be made of a polymer having a heat resistance of 115° C. and a refraction factor of 1.45 or more at 20° C.

In the case where the aforesaid photosensitive layer and the protection layer of the heat developing photosensitive material according to the present invention are individually formed, they can be applied by any of the following application methods: a dipping method, an air knife method, a curtain application method and a hopper extruding method disclosed in U.S. Pat. No. 2,681,294. Two or more layers can be simultaneously applied as the need arises.

The heat-developable photosensitive material according to the present invention permits a black image to be formed by metallic silver generated due to an oxidation-reduction reaction performed by the organic silver salt and the reducing agent in an image exposure portion due to image exposure and heating (heat development).

The heat-developable photosensitive material according to the present invention is able to form a pattern depending upon the difference in the light absorption by utilizing the light absorption of the oxidized material (oxidized reducing agent) formed by the aforesaid oxidation-reduction reaction. That is, a pattern can be formed depending upon the difference in the light absorption in such a way that light having a predetermined wavelength is absorbed in a portion (the image exposure portion) in which the oxidized material has been formed, but the absorption of light is small in a portion (non-image-exposure portion) in which no oxidized material is formed.

By utilizing the difference in the aforesaid light absorption, the heat-developable photosensitive material according to the present invention is able to form a pattern composed of a polymerized portion and a non-polymerized portion (hereinafter called a "polymerization-non-polymerization pattern"). That is, the photosensitive layer according to the present invention which contains a polymerizable polymer precursor and a light polymerization initiator is able to form the polymerization-non-polymerization pattern due to image exposure, heat development and polymerization exposure. The reason why the polymerization-non-polymerization pattern is formed is that the polymerization does not proceed in the image exposed portion due to the light absorption of silver or the oxidized material (oxidized reducing agent) formed due to the oxidation and reduction reaction at the time of the heat development and the polymerization proceeds in the non-image-exposed portion.

The polymerizable polymer precursor and the light polymerization initiator may be contained by the photosensitive layer. As an alternative to this, a separate polymerization layer may be formed which contains the polymerizable polymer precursor and the light polymerization initiator.

The photosensitive layer and the polymerization layer may be stacked in a sequential order of first the polymerization layer and then the photosensitive layer when viewed from the supporting member, or in order of the photosensitive layer and then the polymerization layer, when viewed from the supporting member. As an alternative to this, the photosensitive layer may be formed on one side of the supporting member and the polymerization layer may be formed on the other side of the supporting member.

The light polymerization initiator for use in the heat-developable photosensitive material according to the present invention is exemplified by a carbonyl compound, an ionic compound, a halogen compound, a redox-type polymerization initiator or a peroxide-type initiator which is sensitized by a dye, such as pyrylium.

Specifically, the carbonyl compound is exemplified by a diketone such as benzil, 4,4'-dimethoxybenzil, diacetyl, and camphor quinone; benzophenone, such as 4,4'-bis (diethylamino) benzophenone, and 4,4'-dimethoxybenzophenone; acetophenone: acetophenone such as acetone phenone and 4-methoxyacetophenone; benzoinalkylether; thioxanthone such as 2-chlorothioxanthone, 2,4-dichlorothioxanthone, 2,4-diethylthioxanthone, and thioxanthone-3-carboxylic acid-β-methoxyethylester; chalcone and styrylketone having a dialkylamino group; coumarin such as 3,3'-carbonyl bis(7-methoxycoumarin) and 3,3'-carbonyl bis(7-diethyl aminocoumarin).

The ionic compound is exemplified by dibenzothiazolylsulfide, decylphenylsulfide and disulfide.

The halogen compound is exemplified by carbon tetrabromide, quinoline sulfonylchloride, and S-triazine having a trihalomethyl group.

The redox-type light polymerization initiator is exemplified by a combination of an ionic trivalent iron (for example, ferric ammonium citrate) and a peroxide, and a combination of a light reducing dye such as riboflavin and methylene blue and a reducing agent such as triethanolamine and ascorbic acid.

As the light polymerization initiator (sensitizer included), two or more types of light polymerization initiators may be combined with each other to efficiently perform the light polymerization.

The combination of the light polymerization initiators is exemplified by a combination of chalcone having a dialkylamino group, styrylketone or coumarin and S-triazine having a trihalomethyl group or camphor quinone.

As the polymerizable polymer precursor for use in the heat-developable photosensitive material according to the present invention, a compound having at least one reactive vinyl group in one molecule thereof is preferred.

The reactive vinyl group of the aforesaid compound is exemplified by styrene-type vinyl group, acrylic acid-type vinyl group, methacrylic acid-type vinyl group, acryl-type vinyl group, vinyl ether, and a substituted or unsubstituted vinyl group such as ester-type vinyl group, such as vinyl acetate having a polymerization reactivity.

The polymerizable polymer precursor which meets the aforesaid requirements is exemplified by monovalent monomer such as styrene, methylstyrene, chlorostyrene, bromostyrene, methoxystyrene, dimethylaminostyrene, cyanostyrene, nitrostyrene, hydroxystyrene, aminostyrene, carboxystyrene, acrylic acid, methyl acrylate, ethyl acrylate, cyclohexyl acrylate, acrylic amide, methacrylic acid, methyl methacrylate, ethyl methacrylate, propyl methacrylate, butyl methacrylate, phenyl methacrylate, cyclohexyl methacrylate, vinylpyridine, N-vinyl pyrrolidone, N-vinyl imidazole, 2-vinyl imidazole, N-methyl-2-vinyl imidazole, propylvinylether, butylvinylether, isobutylvinylether, β-chloroethylvinylether, phenylvinylether, p-methylphenylvinylether, and p-chlorophenylvinylether.

Furthermore, any one of the following bivalent monomers may be used: divinylbenzene, distyryl oxalate, distyryl malonate, distyryl succinate, distyryl glutarate, distyryl adipate, distyryl maleate, distyryl fumarate; β,β'-dimethylglutaric distyryl, 2-bromoglutaric distyryl, α,α'-dichloroglutaric distyryl, distyryl terephthalate, di(ethylacrylate)oxalate, di(methylacrylate) oxalate, di(ethylacrylate)maleate, di(methylethylacrylate) maleate, di(ethylacrylate)succinate, di(ethylacrylate) glutarate, di(ethylacrylate)adipate, di(ethylacrylate) maleate, di(ethylacrylate)fumarate, β',β'-di(ethylacrylate)dimethylglutarate, ethylene diacrylamide, propylene diacrylamide, 1,4-phenylene diacrylamide, 1,4-phenylene bis(oxyethylacrylate), 1,4-phenylene bis(oxymethylethylacrylate), 1,4-bis(acryloyloxyethoxy)cyclohexane, 1,4-bis(acryloyloxymethylethoxy)cyclohexane, 1,4-bis(acryloyloxyethoxycarbamoyl)benzene, 1,4-bis(acryloyloxymethylethoxycarbamoyl)benzene, 1,4-bis(acryloyloxyethoxycarbamoyl)cyclohexane, bis(acryloyloxyethoxycarbamoylcyclohexyl)methane, di(ethylmethacrylate)oxalate, di(methylethylmethacrylate)oxalate, di(ethyl methacrylate)maleate, di(methyl ethyl methacrylate)maleate, di(ethyl methacrylate)succinate, di(methyl ethyl methacrylate)succinate, di(ethyl methacrylate)glutarate, di(ethyl methacrylate)adipate, di(ethyl methacrylate)maleate, di(ethyl methacrylate)fumarate, di(methyl ethyl methacrylate)fumarate, β,β'-(ethyl methacrylate)dimethyl glutarate, 1,4-phenylene bis(oxyethyl methacrylate), 1,4-bis(methacryloyl oxyethoxy)cyclohexane acryloyl oxyethoxy ethylvinyl ether.

Furthermore, any one of the following trivalent monomers may be employed: pentaerythritol triacrylate, pentaerythritol trimethacrylate, pentaerythritol tri(hydroxystyrene), dipentaerythritol hexaacrylate, cyanuric triacrylate, cyanuric trimethacrylate, 1,1,1-trimethylol propane triacrylate, 1,1,1-trimethylol propane trimethacrylate, tri(ethylacrylate)cyanurate, 1,1,1-trimethylolpropane tri(ethylacrylate), tri(ethylvinylether)cyanurate, a condensed substance of 1,1,1-trimethylolpropane tri(toluenediisocyanate) and hydroxyethylacrylate, and a condensed substance of 1,1,1-trimethylolpropane tri(hexanediisocyanate) and p-hydroxystyrene.

Furthermore, a quadrivalent monomer such as ethylene tetraacryl amide and propylene tetraacrylamide or hexavalent monomer, such as dipentaerythritol hexaacrylate, may be employed.

Two or more types of the aforesaid polymerizable polymer precursors may be employed.

In the case where the polymerizable polymer precursor and the light polymerization initiator are contained in the heat-developable photosensitive material according to the present invention, it is preferable that the light polymerization initiator be present in amounts from 0.01 mole to 10 moles per mole of the reducing agent, preferably 0.5 mole to 3.0 moles. It is preferable that the light polymerization initiator be present in amounts from 0.1 part by weight to 30 parts by weight with respect to 100 parts by weight of the polymerizable polymer precursor and more preferably 0.5 part by weight to 10 parts by weight.

In the present invention, it is preferable that the thickness of the photosensitive layer be 0.1 μm to 50 μm, more preferably 1 μm to 30 μm, and most preferably 2 μm to 20 μm.

In the case where the polymerization layer is formed separately from the photosensitive layer, the preferred thickness range of the polymerization layer is the same as the aforesaid preferred range for the photosensitive layer.

Next, a method of forming an image by using the photosensitive material according to the present invention will now be described.

Since the photosensitive material according to the present invention contains the aforesaid sensitizing dye expressed by general formula (I), it exhibits excellent sensitivity and heat-developable characteristics and has excellent sensitivity in the red and near infrared region. Hence, when the photosensitive material according to the present invention is subjected to image exposure corresponding to a desired image with a semiconductor laser beam or LED beam and particularly, light of 600 nm to 830 nm, a silver core is generated, causing a corresponding latent image to be formed first. When the latent image is properly heated (heat-developed), an image corresponding to the latent image can be developed due to the oxidation-reduction reaction.

The image forming method according to the present invention which forms an image as described above permits the desired process to be performed easily and is conveniently mechanized. Furthermore, the method is compact and economical method because the semiconductor laser or LED beam can be used. Even if the image exposure is performed in a short time of $1 \times 10^{-5}$ sec/dot to $1 \times 10^{-7}$ sec/dot, a problem of the reciprocity law failure does not arise.

Furthermore, the polymerization-non-polymerization pattern can be formed in the heat-developable photosensitive material containing the aforesaid polymerizable polymer precursor and the light polymerization initiator by polymerization-exposing the entire surface of the heat-developable photosensitive material in a direction from the photosensitive layer after the heat development has been completed.

As the light source for use in the polymerization exposure process, sun light, a tungsten lamp, a mercury lamp, a halogen lamp, a xenon lamp, a fluorescent lamp, an LED, or a laser beam may be used, for example.

The wavelength of the polymerization exposure light may be the same as or different from the light used in the image exposure step.

Even if light having the same wavelength is used, the latent image can be written in the aforesaid image exposure step with light, the intensity of which is of such a degree that light polymerization does not take place. The photosensitive silver halide usually has a sufficiently higher photosensitivity than the light polymerization initiator. Therefore, upon exposure of a lesser intensity radiation only a latent image is formed in the photosensitive silver halide. It is preferable that light of about 100 µJ/cm², more preferably 30 µJ/cm², and most preferably 15 µJ/cm² is used to perform the exposure in the image exposure step. Light having an intensity of 500 µJ/cm² or less is used on the surface of the photosensitive material in the polymerization exposure step. Where the polymerization exposure is not to be performed, the image exposure step is conducted under the aforesaid conditions.

A variety of means may be employed to develop the photosensitive material according to the present invention. For example, the photosensitive material may be brought into contact with a simple heating plate or the like, or with a heated drum. The heat developing can be conducted by passing the photosensitive material through a heated space. As an alternative to this, the photosensitive material may be heated by RF or laser beam. A suitable heating temperature is 80° C. to 160° C., preferably 100° C. to 160° C., and more preferably 110° C. to 150° C. By elongating or shortening the heating period, a higher or lower temperature is realized to heat the photosensitive material. The development period is usually 1 second to 60 seconds, preferably 3 seconds to 20 seconds.

As described above, according to the present invention, an image of excellent quality can be formed while overcoming the problem of the reciprocity even if the exposure is performed at high illuminance and in a short exposure time because a laser beam or the like is used.

The present invention will now be specifically described with reference to illustrative example.

When term "part" is used hereinafter, the term means part(s) by weight.

EXAMPLE 1

Dispersed liquid (A) composed as follows was prepared under a safety light using a homomixer.

| | |
|---|---|
| Polyvinylbutyral | 3.0 parts |
| Polymethylmethacrylate | 1.0 parts |
| Silver behenate | 2.5 parts |
| Behenic acid | 1.5 parts |
| Azelaic acid | 0.5 part |
| Silver bromide | 0.6 part |
| Phthaladinone | 0.5 part |
| 4,4'-methylene bis(2-t-butyl-6-methylphenol) | 2.4 parts |
| xylene | 30 parts |
| n-butanol | 3.0 parts |

The crystal of the silver bromide employed was cubic in form, the index of a crystal plane of which was {100}, and a mean length of one crystal side was 0.08 µm.

0.03 part of the aforesaid sensitizing dye (C-6) was dissolved in 0.5 part of methanol, and a solution thus obtained was added to the aforesaid dispersed liquid (A). The dispersed liquid (A), to which the sensitizing dye was added, was applied to a polyethylene terepthalate (PET) film to provide a dry thickness of 5 µm, so that a photosensitive layer was formed. Then, a polyvinyl alcohol layer having a dry thickness of 2 µm and serving as a protection layer was formed on the photosensitive layer, so that a photosensitive material according to the present invention was obtained.

The thus obtained photosensitive material was subjected to image exposure at a speed of $1.67 \times 10^{-7}$ sec/dot by using a semiconductor laser, the wavelength of which was 670 nm. Then, heat development was performed for 10 seconds in a heat-developable unit, the temperature of which was set to 120° C. The reflection optical density of the obtained image at 400 nm was measured, and the characteristic curve of the resulting reflection optical density with respect to the image exposure energy is shown in FIG. 1.

The sensitivity of the photosensitive material was 30.0 µJ/cm². The "sensitivity" is an energy value which is obtained by adding 1.0 to a fog density (the reflection optical density or the transmission optical density at an energy of 0.1 µJ/cm²) and which is required to be the reflection optical density or the transmission optical density.

As a result, it should be understand that the photosensitive material according to Example 1 has an excellent optical density and sensitivity.

EXAMPLE 2

A dispersed liquid (B) having the following composition was prepared under a safety light by using a homomixer.

| | |
|---|---|
| Silver behenate | 2.0 parts |
| Polyvinylbutyral | 8.0 parts |
| Behenic acid | 2.0 parts |
| Silver iodobromide (in the form of a cubic system, the index of a plane of the crystal was {100} and a mean length of one side was 0.06 μm) | 0.8 part |
| Phthaladinone | 0.5 part |
| Homophthalic acid | 0.6 part |
| 2,2'-methylene bis(4,6-di-t-butylphenol) | 2.6 parts |
| xylene | 30 parts |
| n-butanol | 40 parts |

0.03 parts of the aforesaid sensitizing dye (C-3) was dissolved in 0.5 parts of dimethylformamide, and then a solution thus obtained was added to the aforesaid dispersed liquid (B). The dispersed liquid (B), to which the sensitizing dye was added, was applied to a polyethylene terepthalate film so as to have a dry thickness of 10 μm, so that a photosensitive layer was formed. Then, a polyvinyl alcohol layer having a dry thickness of 2 μm and serving as a protection layer was formed on the photosensitive layer, so that a photosensitive material according to the present invention was obtained.

The thus obtained photosensitive material was subjected to image exposure at a speed of $1.67 \times 10^{-7}$ sec/dot using a semiconductor laser, the wavelength of which was 670 nm. Then, heat development was performed for 10 seconds in a heat-developable unit, the temperature of which was set to 115° C., resulting in a white and black image having excellent contrast.

EXAMPLE 3

The aforesaid sensitizing dye (C-5) was used in place of the sensitizing dye (C-3) according to Example 2 and the residual conditions were the same as those according to Example 2, so that a photosensitive material according to this example was prepared.

The photosensitive material thus prepared was used to form an image in a manner similar to that according to Example 2, resulting in a white and black image having excellent contrast.

EXAMPLE 4

The 2.0 parts of the silver iodobromide according to Example 2 was replaced by 2.0 parts of silver iodobromide containing iridium, and the residual conditions were the same as those according to Example 2, so that a photosensitive material according to this example was prepared. The content of iridium was $1 \times 10^{-4}$ mole with respect to one mole of silver iodobromide. Iridium was present in the surface layer of the silver iodobromide crystal. The thickness of the surface layer was 10% or less of the length of one side of the silver iodobromide.

The photosensitive material thus prepared was used to form an image under the same conditions as those according to Example 2 while doubling the image exposure speed, thereby resulting in a white and black image having excellent contrast.

EXAMPLE 5

Dispersed liquid (C) composed as follows was prepared under a safety light by using a homomixer.

| | |
|---|---|
| Polyvinylbutyral | 3.0 parts |
| Silver behenate | 2.5 parts |
| Behenic acid | 1.5 parts |
| Homophthalic acid | 0.6 part |
| Silver bromide | 0.6 part |
| Phthaladinone | 0.5 part |
| 2,2'-methylene bis(4-methyl-6-t-butylphenol) | 2.4 parts |
| xylene | 30 parts |
| n-butanol | 30 parts |

The crystal of the silver bromide was cubic, the index of a crystal plane was {100}, and a mean length of one side was 0.07 μm.

0.03 part of the aforesaid sensitizing dye (C-8) was dissolved in 5.0 parts of N,N-dimethylformamide (DMF), and a solution thus obtained was added to the aforesaid dispersed liquid (C).

The dispersed liquid (C), to which the sensitizing dye was added, was applied to a polyethylene terepthalate (PET) film so as to have a dry thickness of 10 μm, so that a photosensitive layer was formed. Then, a polyvinyl alcohol layer having a dry thickness of 2 μm and serving as a protection layer was formed on the photosensitive layer, so that a photosensitive material according to the present invention was obtained.

The thus obtained photosensitive material was subjected to image exposure at a speed of $1.67 \times 10^{-7}$ sec/dot by using a semiconductor laser, the wavelength of which was 670 nm. Then, heat development was performed for 10 seconds in a heat-developable unit, the temperature of which was set to 120° C. The reflection optical density of the obtained image was measured, and the characteristic curve of the resulting reflection optical density with respect to the image exposure energy was shown in FIG. 1. It should be noted that the transmission optical density was measured by using a transmission and reflection color density meter NLM-STD-Tr manufactured by Narumi.

The sensitivity of the photosensitive material was 19.0 μJ/cm².

The photosensitive material according to this example was subjected to a durability test in which the photosensitive material was placed in a constant heat and humidity vessel set to 50° C. and 70% RH for 30 hours. The photosensitive material was taken out of the vessel before an image was formed. The image was formed in the durability test in a manner similar to the aforesaid examples such that a semiconductor laser having a wavelength of 670 nm at a speed of $1.67 \times 10^{-7}$ sec/dot was used to expose the image to light. Heat development was performed for 10 seconds in a heat developing unit set to 120° C. Although the sensitivity of the photosensitivity material deteriorated somewhat due to the extreme conditions of the durability test, no practical problem took place.

EXAMPLE 6

Similarly to Example 5, the sensitizing dye (c-8) was added to dispersed liquid (C), and then a solution prepared by dissolving 0.3 parts of the aforesaid thiol (d-1) in 1.5 parts of DMF was added.

The dispersed liquid (C), to which the sensitizing dye and the thiol compound were added, was used to prepare a photosensitive material according to this example similar to Example 5.

Figure 2:
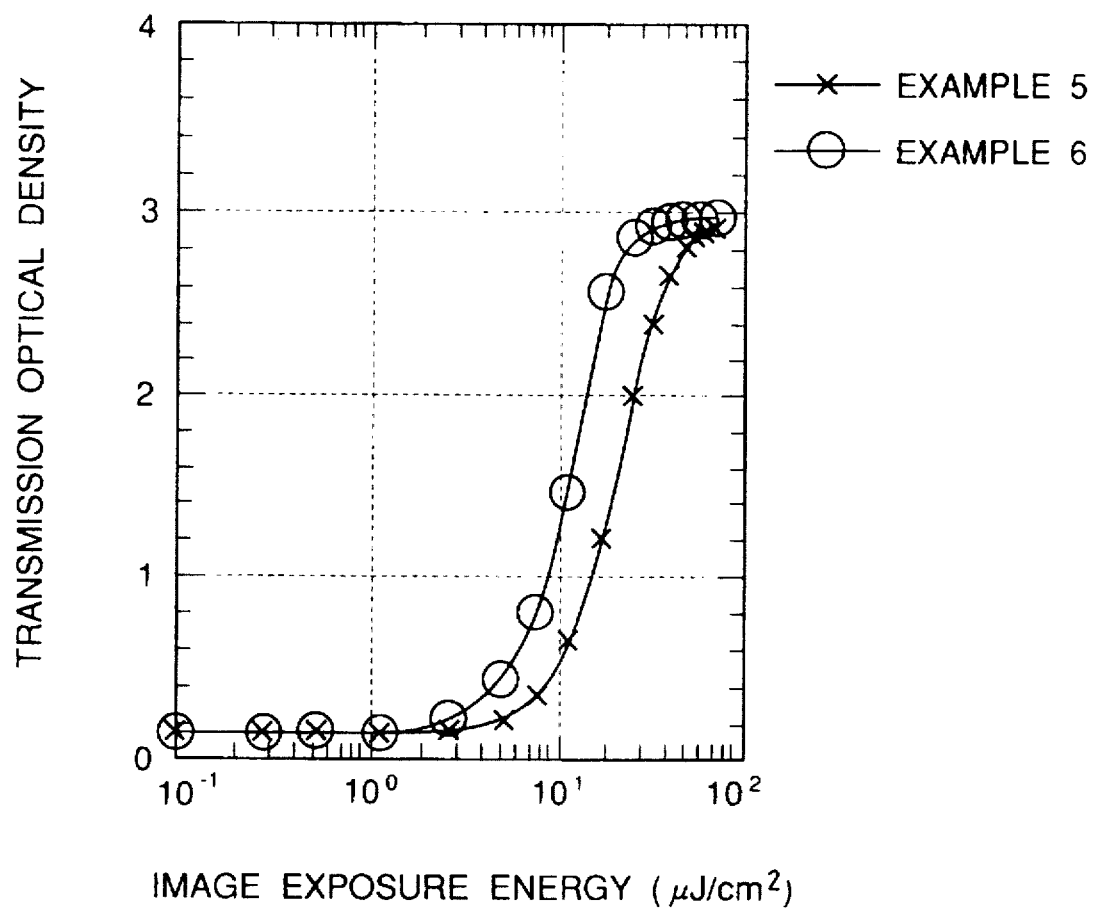
FIG. 2 is a graph which illustrates the transmission optical density with respect to image exposing energy of a photosensitive material according to Examples 5 and 6.

The photosensitive material thus obtained was used to form an image in a manner similar to Example 5. The transmission optical density of the obtained image was measured in a manner similar to Example 5, resulting in values shown in FIG. 2.

The sensitivity of the photosensitive material according to this example was 11.1 µJ/cm².

The photosensitive material according to this example was subjected to a durability test arranged similar to Example 5. The sensitivity did not deteriorate after the durability test had been carried out.

EXAMPLE 7

2.4 parts of the reducing agent 2,2'-methylene bis-(4-methyl-6-t-butylphenol) according to Example 5 was used in place of 2.4 parts of 4,4'-methylene bis(2-methyl-6-t-butylphenol), and the residual conditions were the same as those according to Example 5, so that a photosensitive material according to this example was obtained.

The thus obtained photosensitive material was subjected to image exposure at a speed of $1.67 \times 10^{-7}$ sec/dot by using a semiconductor laser, the wavelength of which was 670 nm. Then, heat development was performed for 10 seconds in a heat developing unit, the temperature of which was set to 130° C., resulting in an excellent image having its absorption peak at 410 nm.

EXAMPLES 8 TO 11 AND COMPARATIVE EXAMPLE 1

Dispersed liquid (D) composed as follows was prepared under a safety light by using a homomixer.

| | |
|---|---|
| Polyvinylbutyral | 3.0 parts |
| Polymethylmethacrylate | 1.0 part |
| Silver behenate | 2.5 parts |
| Behenic acid | 2.0 parts |
| Azelaic acid | 0.2 part |
| Silver bromide | 0.6 part |
| Phthaladinone | 0.5 part |
| 2,2'-methylene bis(4-methyl-6-t-butylphenol) | 2.4 parts |
| xylene | 40 parts |
| n-butanol | 15 parts |

The crystal of the silver bromide was cubic, the index of a plane of which was (1,0,0), and a mean length of one side was 0.06 µm. Iridium was present in the surface layer of the silver bromide crystal. The thickness of the surface layer in which iridium was present was 10% or less of the length of one side of the silver bromide crystal.

0.03 part of the aforesaid sensitizing dye (C-6) was dissolved in 5.0 parts of DMF, and a solution thus obtained was added to the aforesaid dispersed liquid (D).

The dispersed liquid (D), to which the sensitizing dye was added, was used to form the photosensitive material according to the present invention in a manner similar to Example 5 (Example 8).

The photosensitive material was subjected to the image exposure and heat development similar to Example 5 so as to measure the sensitivity, resulting in a sensitivity of 17.5 µJ/cm².

Similar to Example 8, a solution obtained by dissolving 0.3 part of the aforesaid thiol compound (d-3) in 1.5 parts of the DMF was added to the dispersion liquid (D) to which the sensitizing dye (c-6) was added.

The dispersed liquid (D) to which the sensitizing dye and the thiol compound were added was used to prepare the photosensitive material according to the present invention similar to Example 5.

The photosensitive material was subjected to the image exposure and heat development similar to Example 5 so as to measure the sensitivity, resulting in that the sensitivity of the photosensitive material was 10.2 µJ/cm².

EXAMPLE 10

Similar to Example 8, a solution obtained by dissolving 0.8 parts of the aforesaid thiol compound (d-3) in 1.5 parts of the DMF was added to the dispersion liquid (D) to which the sensitizing dye (c-6) was added.

The dispersed liquid (D) to which the sensitizing dye and the thiol compound were added was used to prepare the photosensitive material according to the present invention similar to Example 5.

The photosensitive material was subjected to image exposure and heat development similar to Example 5 to measure the sensitivity. The resulting sensitivity of the photosensitive material was 11.8 µJ/cm².

EXAMPLE 11

The sensitizing dye (c-6) according to Example 9 was replaced by the aforesaid sensitizing dye (c-3), the thiol compound (d-3) was replaced by the aforesaid thiol compound (d-9), and the residual conditions were the same as those according to Example 9, so that a photosensitive material according to the present invention was prepared.

The photosensitive material was subjected to image exposure and heat development similar to Example 5 to measure sensitivity. The resulting sensitivity of the photosensitive material was 11.5 µJ/cm².

The photosensitive materials according to Examples 8 to 11 were then subjected to a durability test in which each of the photosensitive materials was placed in a constant heat and humidity vessel at 50° C. and 70% RH for 40 hours and the photosensitive material was taken out of the vessel before an image was formed. An image was formed in the durability test in a manner similar to Example 5. As a result, the sensitivity and the γ-characteristics of the photosensitive materials according to Examples 9 to 11 were not changed. The sensitivity and the γ-characteristics of the photosensitive material according to Example 8 deteriorated only slightly, which was of no practical problem.

COMPARATIVE EXAMPLE 1

The sensitizing dye (c-6) according to Example 10 was replaced by 3,3'-diethyl-2,2'-thiodicarbocyanoiodide and the residual conditions were the same as those according to Example 10, so that a comparative photosensitive material was formed.

Figure 3:
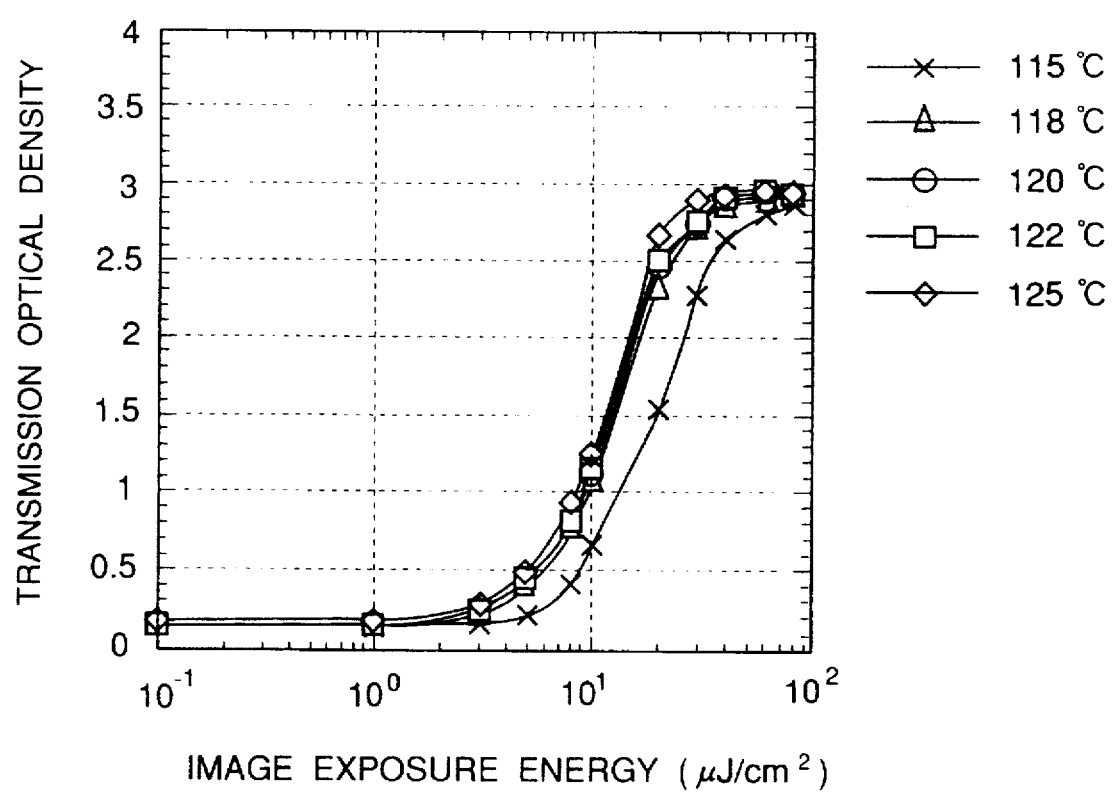
FIG. 3 is a graph which illustrates the transmission optical density with respect to image exposing energy of a photosensitive material according to Example 9.
Figure 4:
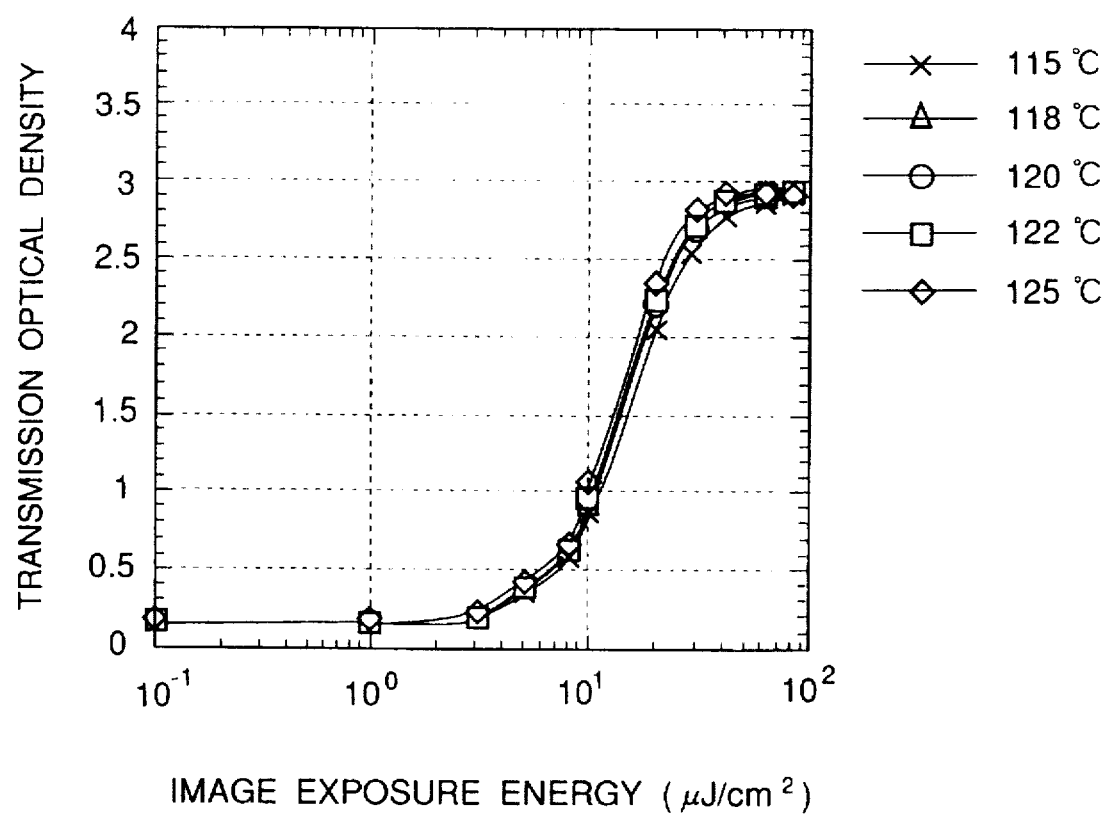
FIG. 4 is a graph which illustrates the transmission optical density with respect to image exposing energy of a photosensitive material according to Example 10.
Figure 5:
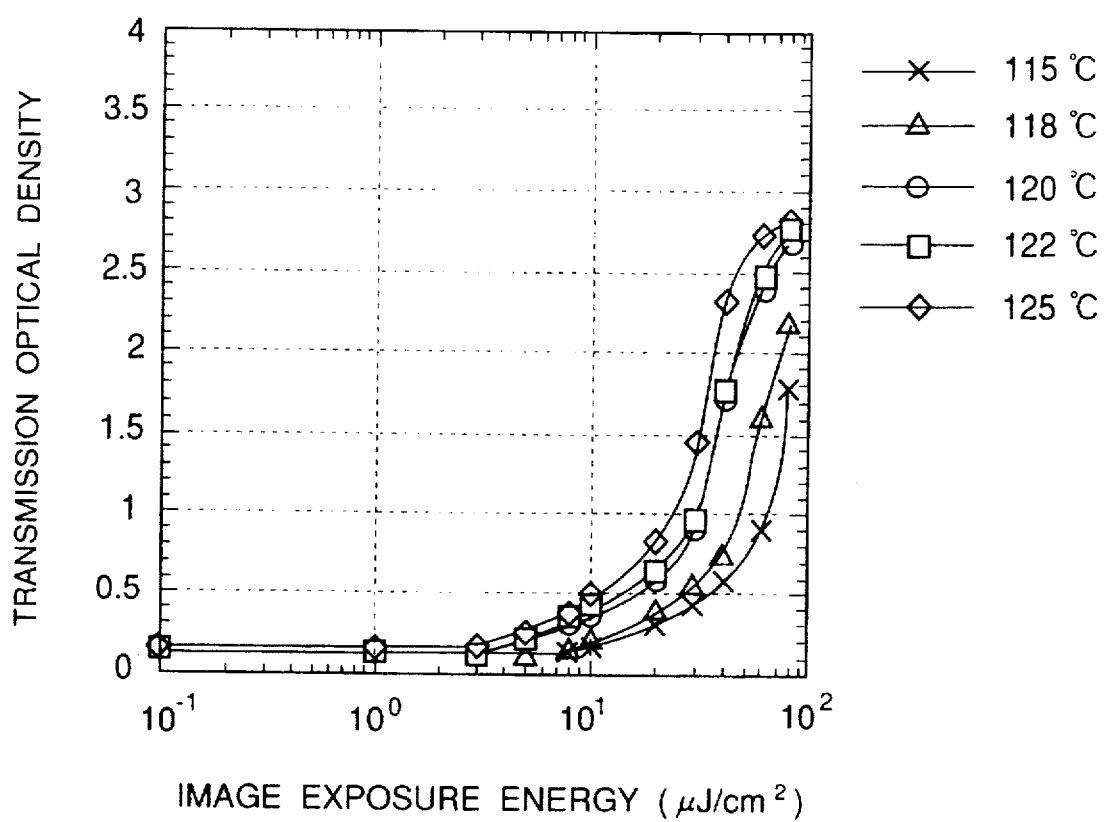
FIG. 5 is a graph which illustrates the transmission optical density with respect to image exposing energy of a photosensitive material according to Comparative Example 1.

The photosensitive materials according to Examples 9 and 10 and Comparative Example 1 were subjected to image exposure and heat development, and the transmission optical density of each of the obtained images was measured. The results of the measurement of the transmission optical density with respect to the image exposure energy are shown in FIGS. 3 to 5 as characteristic curves. The transmission optical density was measured when the heat developing temperature was 115° C., 118° C., 120° C., 122° C. and 125° C. The result of the measurement of the photosensitive material according to Example 9 is shown in FIG. 3. The result of the measurement of the photosensitive material according to Example 10 is shown in FIG. 4. The result of the measurement of the photosensitive material according to Comparative Example 1 is shown in FIG. 5.

As can be understood from FIGS. 3 to 5, the material of Example 9 and Example 10 provided substantially the same characteristic curves regardless of the heat developing temperature, but the characteristic curve of Comparative Example 1 was changed considerably. That is, the photosensitive materials according to Examples 9 and 10 have a wide heat developing latitude, but the photosensitive material according to Comparative Example 1 had a narrow heat developing latitude. Furthermore, the photosensitive material according to Comparative Example 1 displayed unsatisfactory sensitivity.

EXAMPLE 12

2.4 parts of reducing agent 2,2'-methylene bis- (4-methyl-6-t-butylphenol) of the dispersed liquid (C) was replaced by 2.6 parts of 2-methyl-4-(3,5-di-t-butyl-4-hydroxybenzil)-1-naphthol and the residual conditions were the same as those of the dispersion liquid (C), so that dispersed liquid (E) was prepared.

A solution obtained by dissolving 0.03 part of the aforesaid sensitizing dye (C-6) in 5.0 parts of DMF and a solution obtained by dissolving 0.2 part of the aforesaid thiol compound (d-1) in 1.0 part of the DMF were added to the aforesaid dispersed liquid (E) .

The dispersed liquid (E), to which the sensitizing dye and the thiol compound were added, was applied on a PET film in a dry thickness of 9 μm, so that a photosensitive layer was formed. Then, a polyvinyl alcohol layer having a dry thickness of 2 μm and serving as a protection layer was formed on the photosensitive layer. A polymerized layer having a thickness of 6 μm was formed on one side of the PET film, while a photosensitive layer was formed on the other side of the PET film from which the polymerization layer was formed. The polymerization layer was composed of 1.75 parts of ARONIX M6300 (manufactured by Toa Gosei), 2.25 parts of a polyester resin (BYRON #200 manufactured by Toyobo), 0.2 part of rubber chloride (manufactured by Sanyo Kokusaku Pulp), 0.37 part of 2,4-diethylthioxanthone, and 0.37 part of p-diethylamino benzoic acid ethyl ester. Thus, a photosensitive material according to the present invention was obtained.

The photosensitive layer of the aforesaid photosensitive material was subjected to image exposure by using a semiconductor laser, the wavelength of which was 670 nm, at a speed of $1.67 \times 10^{-7}$ sec/dot, and then the photosensitive material was heated by a drum-type heater set to 120° C. for 10 seconds. Then, the polymerization exposure was performed for 2 seconds by using an extra-high voltage mercury lamp (USH-500D manufactured by Ushio Denki) in a direction from the photosensitive layer of the photosensitive material. The ultra-high voltage mercury lamp was disposed at a distance of 80 cm from the photosensitive material during the polymerization exposure.

When the PET film of the photosensitive material and the copper plate were separated from each other, a portion in which the polymerization layer was polymerized (hereinafter called a "polymerized portion") was left on the copper plate, while a portion in which the polymerization layer was not polymerized (hereinafter called a "non-polymerized portion") was left on the PET film. The polymerized portion corresponds to the portion which was not irradiated with light at the time of the image exposure, while the non-polymerized portion corresponds to the portion which was irradiated with light at the time of the image exposure.

Although the invention has been described in its preferred form with a certain degree of particularly, it is understood that the present disclosure of the preferred form may be changed in the details of construction and the combination and arrangement of parts may be revised to without departing from the spirit and the scope of the invention as hereinafter claimed.

What is claimed is:

1. A heat-developable photosensitive material comprising a photosensitive layer formed on a support, said photosensitive layer at least containing an organic silver salt, a reducing agent, either a photosensitive silver halide or a photosensitive silver halide forming agent, and a sensitizing dye of the following general formula (I):

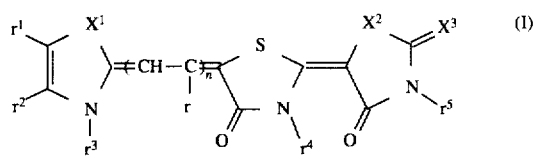

where r is hydrogen, halogen, unsubstituted alkyl, alkoxyalkyl, alkylhalide, hydroxyalkyl, aminoalkyl, carboxyalky, alkoxy, aryl or amino; $r^1$ and $r^2$ are each aryl or $r^1$ and $r^2$ are bonded to each other to form a condensed ring; $r^3$ is alkoxyalkyl having 1 to 18 carbon atoms, alkyl halide having 1 to 18 carbon atoms, hydroxyalkyl having 1 to 18 carbon atoms, aminoalkyl having 1 to 18 carbon atoms, carboxyalkyl having 2 to 10 carbon atoms, hydrogen, unsubstituted alkyl, alkenyl, aryl or aralkyl, $r^4$ and $r^5$ are each hydrogen, alkyl, alkoxyalyl alkylhalide, hydroxyalkyl, aminoalkyl, carboxyalkyl, alkenyl, aryl, or aralkyl; $X^1$ is oxygen, sulfur, carbon, nitrogen or selenium, wherein when $X^1$ is carbon or nitrogen, then $X^1$ is bonded to hydrogen, alkyl, alkoxyalkyl, alkylhalide, hydroxyalkyl, aminoalkyl, carboxyalkyl, aryl, or aralkyl; $X^2$ is oxygen or sulfur; $X^3$ is oxygen or sulfur; and n is 2.

2. A heat-developable photosensitive material according to claim 1, wherein said photosensitive silver halide is in crystal form and contains iridium ions in a surface layer of said crystal.

3. A heat-developable photosensitive material according to claim 2, wherein the thickness of said surface layer is 10% or less of the length of one side of said crystal of silver halide.

4. A heat-developable photosensitive material according to claim 2, wherein the content of iridium ions is $1 \times 10^{-5}$ to $1 \times 10^{-2}$ mole per mole of said silver halide, based on the total amount of said silver halide in said photosensitive layer.

5. A heat-developable photosensitive material according to claim 1, further containing a thiol compound of the following general formula (II) or (III):

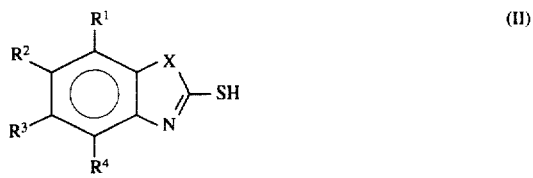

-continued

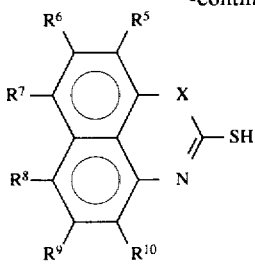
(III)

where $R^1$ to $R^4$ are each hydrogen, unsubstituted alkyl, alkoxyalkyl, alkylhalide, hydroxyalkyl, aminoalkyl, carboxyalkyl, alkoxy, carboxyl, aryl, sulfonic acid, amino, nitro, halogen, amide, alkenyl or alkynyl or $R^1$ and $R^2$, $R^2$ and $R^3$, or $R^3$ and $R^4$ are bonded to each other to form a condensed ring; wherein $R^5$ to $R^{10}$ are each hydrogen, alkyl, alkoxyalkyl, alkylhalide, hydroxyalkyl, aminoalkyl, carboxyalkyl, alkoxy, carboxyl, aryl, sulfonic acid, amino, nitro, halogen, amide, alkenyl or alkynyl; X is —O—, —N($R^{11}$)— or —S—, and $R^{11}$ is hydrogen, alkyl or aryl.

6. A heat-developable photosensitive material according to claim 5, wherein the content of said thiol compound is $1.0 \times 10^{-1}$ to $2.0 \times 10^2$ moles per mole of said sensitizing dye.

7. A heat-developable photosensitive material according to claim 1, wherein said photosensitive layer contains a polymerizable polymer precursor and a light polymerization initiator.

8. A heat-developable photosensitive material according to claim 1, further comprising a polymerization layer containing a polymerizable polymer precursor and a light polymerization initiator.

9. An image forming method comprising the steps of:

(a) imagewise exposing a heat-developable photosensitive material comprising a photosensitive layer formed on a support, said photosensitive layer at least containing an organic silver salt, a reducing agent, either a photosensitive silver halide or a photosensitive silver halide forming agent, and a sensitizing dye of the following general formula (I):

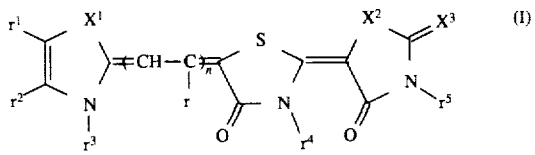
(I)

where r is hydrogen, halogen, unsubstituted alkyl, alkoxyalkyl, alkylhalide, hydroxyalkyl, aminoalkyl, carboxyalkyl, alkoxy, aryl or amino; $r^1$ and $r^2$ are each aryl or $r^1$ and $r^2$ are bonded to each other to form a condensed ring; $r^3$ is alkoxyalkyl having 1 to 18 carbon atoms, alkyl halide having 1 to 18 carbon atoms, hydroxyalkyl having 1 to 18 carbon atoms, aminoalkyl having 1 to 18 carbon atoms, carboxyalkyl having 2 to 10 carbon atoms, hydrogen, unsubstituted alkyl, alkenyl, aryl or aralkyl, $r^4$ and $r^5$ are each hydrogen, alkyl, alkoxyalkyl, alkylhalide, hydroxyalkyl, aminoalkyl, carboxyalkyl, alkenyl, aryl, or aralkyl; $X^1$ is oxygen, sulfur, carbon, nitrogen or selenium, wherein When $X^1$ is carbon or nitrogen, then $X^1$ is bonded to hydrogen, alkyl, alkoxyalkyl, alkylhalide, hydroxyalkyl, aminoalkyl, carboxyalkyl, aryl, or aralkyl; $X^2$ is oxygen or sulfur; $X^3$ is oxygen or sulfur; and n is 2; and (b) heating said exposed heat-developable photosensitive material to form an image having light absorbing and light transmitting portions corresponding to the pattern of the exposed image.

10. An image forming method according to claim 9, including conducting said imagewise exposing step employing a semiconductor laser or an LED.

11. An image forming method comprising the steps of:

(a) imagewise exposing a heat-developable photosensitive material comprising a photosensitive layer formed on a support, said photosensitive layer at least containing a polymerizable polymer precursor, a light polymerization initiator, an organic silver salt, a reducing agent, either a photosensitive silver halide or a photosensitive silver halide forming agent, and a sensitizing dye of the following general formula (I):

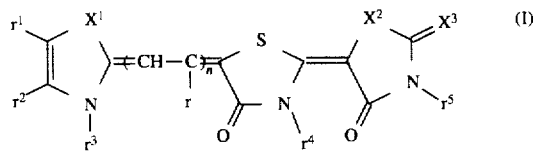
(I)

where r is hydrogen, halogen, unsubstituted alkyl, alkoxyalkyl, alkylhalide, hydroxyalkyl, aminoalkyl, carboxyalkyl, alkoxy aryl or amino; $r^1$ and $r^2$ are each aryl or $r^1$ and $r^2$ are bonded to each other to form a condensed ring; $r^3$ is alkoxyalkyl having 1 to 18 carbon atoms, alkyl halide having 1 to 18 carbon atoms, hydroxyalkyl having 1 to 18 carbon atoms, aminoalkyl having 1 to 18 carbon atoms, carboxyalkyl having 2 to 10 carbon atoms, hydrogen, unsubstituted alkyl, alkenyl, aryl or aralkyl, $r^4$ and $r^5$ are each hydrogen, alkyl, alkoxyalkyl, alkylhalide, hydroxyalkyl, aminoalkyl, carboxyalkyl, alkenyl, aryl, or aralkyl; $X^1$ is oxygen, sulfur, carbon, nitrogen or selenium, wherein When $X^1$ is carbon or nitrogen, then $X^1$ is bonded to hydrogen, alkyl, alkoxyalkyl, alkylhalide, hydroxyalkyl, aminoalkyl, carboxyalkyl, aryl, or aralkyl; $X^2$ is oxygen or sulfur; $X^3$ is oxygen or sulfur; and n is 2; and (b) heating said exposed heat-developable photosensitive material; and (c) conducting polymerization exposure to form an image.

12. An image forming method comprising the steps of:

(a) imagewise exposing a heat-developable photosensitive material comprising (i) a support, (ii) a polymerization layer overlying said support containing a polymerizable polymer precursor and a light polymerization initiator, and (iii) a photosensitive layer overlying said support, said photosensitive layer at least containing an organic silver salt, a reducing agent, either a photosensitive silver halide or a photosensitive silver halide forming agent, and a sensitizing dye of the following general formula (I):

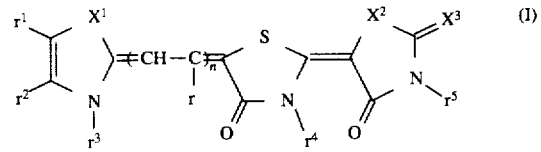
(I)

where r is hydrogen, halogen, unsubstituted alkyl, alkoxyalkyl, alkylhalide, hydroxyalkyl, aminoalkyl, carboxyalkyl, alkoxy, aryl or amino; $r^1$ and $r^2$ are each aryl or $r^1$ and $r^2$ are bonded to each other to form a condensed ring; $r^3$, is alkoxyalkyl having 1 to 18 carbon atoms, alkyl halide having 1 to 18 carbon atoms, hydroxyalkyl having 1 to 18 carbon atoms, aminoalkyl having 1 to 18 carbon atoms, carboxyalkyl having 2 to 10 carbon atoms, hydrogen, unsubstituted alkyl, alkenyl, aryl or aralkyl, $r^4$ and $r^5$ are each hydrogen, alkyl, alkenyl, aryl, or aralkyl; $X^1$ is oxygen or sulfur, carbon, nitrogen or selenium, wherein when $X^1$ is carbon or nitrogen, then $X^1$ is bonded to hydrogen, alkyl, alkoxyalkyl, alkylhalide, hydroxyalkyl, aminoalkyl, carboxyalkyl, aryl, or aralkyl; $X^2$ is oxygen or sulfur; $X^3$ is oxygen or sulfur; and n is 2; and (b) heating said exposed heat-developable photosensitive material; and (c) conducting polymerization exposure to form an image.

13. An image forming method according to claim 11 or claim 12 including conducting said imagewise exposing step employing a semiconductor laser or a LED.

* * * * *

UNITED STATES PATENT AND TRADEMARK OFFICE
CERTIFICATE OF CORRECTION

PATENT NO. : 5,529,889
DATED : June 25, 1996
INVENTOR(S) : HIROMI UEDA ET AL.

Page 1 of 3

It is certified that error appears in the above-identified patent and that said Letters Patent is hereby corrected as shown below:

On the title page,

AT [54] TITLE

"HEAT DEVELOPABLE" should read --HEAT-DEVELOPABLE--.

COLUMN 1

Line 1, "HEAT DEVELOPABLE" should read
--HEAT-DEVELOPABLE--.

COLUMN 4

Line 30, "by" should read --or--.

COLUMN 6

Line 40, "exposed" should read --exposure--.

COLUMN 8

Line 16, "allkynyl" should read --alkynyl--.

COLUMN 11

Line 48, "(I) ." should read --(I).--.
Line 50, "the" (second occurrence) should be deleted.
Line 58, "employed" should read --employed.--.

COLUMN 16

Line 40, "(A) ," should read --(A),--.
Line 65, "understand" should read --understood--.

UNITED STATES PATENT AND TRADEMARK OFFICE
CERTIFICATE OF CORRECTION

PATENT NO. : 5,529,889

DATED : June 25, 1996

INVENTOR(S) : HIROMI UEDA ET AL.

Page 2 of 3

It is certified that error appears in the above-identified patent and that said Letters Patent is hereby corrected as shown below:

COLUMN 17

Line 16, "0.03 parts" should read --0.03 part--.

COLUMN 18

Line 21, "(C) ." should read --(C).--.
Line 63, "(C) ," should read --(C),--.
Line 64, "0.3 parts" should read --0.3 part--.

COLUMN 20

Line 13, "0.8 parts" shoudl read --0.8 part--.

COLUMN 21

Line 29, "(E) ." should read --(E).--.

COLUMN 22

Line 6, "particularly," should read --particularity,--.
Line 9, "to" should be deleted.
Line 27, "carboxyalky," should read --carboxyalkyl,--.
Line 36, "alkoxyalyl" should read --alkoxyalkyl,--.

UNITED STATES PATENT AND TRADEMARK OFFICE
CERTIFICATE OF CORRECTION

PATENT NO. : 5,529,889
DATED : June 25, 1996
INVENTOR(S) : HIROMI UEDA ET AL.

Page 3 of 3

It is certified that error appears in the above-identified patent and that said Letters Patent is hereby corrected as shown below:

COLUMN 23

Line 12, "hydroxyalkyl." should read --hydroxyaklyl,--.
    Line 21, "—S—" should read ---S—;--.
    Line 55, "aralkyl," should read --aralkyl;--.

COLUMN 24

Line 27, "aralkyl," should read --aralkyl;--.
    Line 30, "When" should read --when--.
    Line 65, "aralkyl," should read --aralkyl;--.

COLUMN 26

Line 3, "claim 12" should read --claim 12,--.

Signed and Sealed this

Tenth Day of December, 1996

Attest:

BRUCE LEHMAN

*Attesting Officer*

*Commissioner of Patents and Trademarks*